United States Patent
Zhang et al.

(10) Patent No.: US 11,099,110 B2
(45) Date of Patent: Aug. 24, 2021

(54) METHOD OF IN-SITU TEM NANOINDENTATION FOR DAMAGED LAYER OF SILICON

(71) Applicant: DALIAN UNIVERSITY OF TECHNOLOGY, Liaoning (CN)

(72) Inventors: Zhenyu Zhang, Liaoning (CN); Junfeng Cui, Liaoning (CN); Dongdong Liu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/761,345

(22) PCT Filed: Mar. 13, 2019

(86) PCT No.: PCT/CN2019/077962
§ 371 (c)(1),
(2) Date: May 4, 2020

(87) PCT Pub. No.: WO2020/168601
PCT Pub. Date: Aug. 27, 2020

(65) Prior Publication Data
US 2021/0080361 A1    Mar. 18, 2021

(30) Foreign Application Priority Data

Feb. 19, 2019    (CN) .......................... 201910120919.7

(51) Int. Cl.
*G01N 1/32*     (2006.01)
*G01N 1/34*     (2006.01)
(Continued)

(52) U.S. Cl.
CPC ................. *G01N 1/32* (2013.01); *G01N 1/34* (2013.01); *G01N 3/42* (2013.01); *G01N 23/04* (2013.01);
(Continued)

(58) Field of Classification Search
USPC ....................................................... 250/307
See application file for complete search history.

(56) References Cited

U.S. PATENT DOCUMENTS

| | | | |
|---|---|---|---|
| 5,494,829 A * | 2/1996 | Sandstrom | G01N 21/21 436/518 |
| 6,025,117 A * | 2/2000 | Nakano | C08G 77/60 216/2 |

(Continued)

FOREIGN PATENT DOCUMENTS

| | | |
|---|---|---|
| CN | 102621169 A | 8/2012 |
| CN | 106033040 A | 10/2016 |
| CN | 107621471 A | 1/2018 |

*Primary Examiner* — Phillip A Johnston
(74) *Attorney, Agent, or Firm* — Muncy, Geissler, Olds & Lowe, P.C.

(57) ABSTRACT

A method of in-situ TEM nanoindentation for a damaged layer of silicon is disclosed. Wet etching and ion beam lithography are used for preparing a silicon wedge sample. An etched silicon wedge is thinned and trimmed by a focused ion beam; thinning uses ion beam of 30 kV: 50-80 nA, and trimming uses ion beam of 5 kV: 1-6 pA; and the top width of the silicon wedge is 80-100 nm. The sample is fixed on a sample holder of an in-situ TEM nanomechanical system by using a conductive silver adhesive. The sample is indented with a tip in the TEM, so that the thickness of the damaged layer of the sample is 2-200 nm; and an in-situ nanoindentation experiment is conducted on the damaged layer of the sample in the TEM.

1 Claim, 2 Drawing Sheets

(51) Int. Cl.
*G01N 3/42* (2006.01)
*G01N 23/04* (2018.01)

(52) U.S. Cl.
CPC ... *G01N 2223/418* (2013.01); *G01N 2223/61* (2013.01); *G01N 2223/646* (2013.01)

(56) References Cited

U.S. PATENT DOCUMENTS

| | | | | |
|---|---|---|---|---|
| 7,107,694 | B2* | 9/2006 | Yang | G01Q 60/366 |
| | | | | 33/18.1 |
| 7,232,995 | B2* | 6/2007 | Takaoka | G03F 1/82 |
| | | | | 250/309 |
| 7,878,071 | B2* | 2/2011 | Greer | G01N 3/42 |
| | | | | 73/794 |
| 8,288,737 | B1* | 10/2012 | Walck | H01J 37/32082 |
| | | | | 250/440.11 |
| 10,236,479 | B2* | 3/2019 | Ojiri | B32B 27/08 |
| 10,669,622 | B2* | 6/2020 | Oden | C23C 14/325 |
| 2013/0277573 | A1 | 10/2013 | Miller et al. | |

* cited by examiner

METHOD OF IN-SITU TEM NANOINDENTATION FOR DAMAGED LAYER OF SILICON

TECHNICAL FIELD

The present invention belongs to the technical field of in-situ TEM nanomechanical tests, relates to a nanoindentation method, and particularly relates to a method of in-situ TEM nanoindentation for a damaged layer of silicon and a research method of a grinding mechanism of silicon wafer.

BACKGROUND

Silicon is widely used in semiconductor, microelectronic and optoeletronic industries due to abundant reserves and excellent photoelectric performance. Traditional machining often leads to a thicker damaged layer on the surface of a silicon wafer, and the damaged layer on the surface may seriously affect the performance of the device. An ultraprecision grinding method has the comprehensive advantages of high grinding efficiency, good surface precision and the like, is widely used in the field of ultraprecision machining of the silicon wafer and mainly conducts ultraprecision grinding on the silicon wafer by using diamond wheels, but the thickness of the damaged layer on the surface of the ground silicon wafer is generally greater than 160 nm. Therefore, chemical mechanical polishing is generally required to remove the damaged layer on the surface generated in the ultraprecision grinding process, but chemical mechanical polishing is a method with the longest time and highest cost in the ultraprecision machining process. The thinner the damaged layer on the surface generated in the ultraprecision grinding process is, the shorter the time required for chemical mechanical polishing is, and the lower the cost is. Therefore, reduction of the thickness of the damaged layer on the surface generated in the ultraprecision grinding process has important practical significance for the semiconductor, microelectronic and optoeletronic fields.

To reduce the thickness of the damaged layer on the surface generated in the ultraprecision grinding process, the machining mechanism of ultraprecision grinding shall be known. Ultraprecision grinding is the process of continuously removing the damaged layer by using diamond abrasive particles; and new damaged layers are continuously generated at the same time of removing the damaged layer. However, due to the limitation of the research technical conditions, the generation process of the damaged layers in the ultraprecision grinding process are not clear. In recent years, with the development of in-situ TEM nanomechanical testing technology, researchers have performed in-situ compression experiments on nano-scale crystalline silicon to explore the transition process from the crystalline silicon to amorphous silicon. However, in the experimental method, the sample is only subjected to uniaxial compressive stress, and the sample is the crystalline silicon without a damaged layer. The experimental conditions are quite different from those of the ultraprecision grinding process. Thus, the experimental results are different from ultraprecision grinding results. In an indentation experiment, the sample is subjected to complex forces. In addition to the axial compressive stress, the sample is also subjected to shear stress, which is similar to the stress of the sample in the ultraprecision grinding process. Therefore, development of an experimental method of in-situ TEM nanoindentation for a damaged layer of silicon is very important for researching the ultraprecision grinding mechanism of the silicon wafer.

SUMMARY

A method of in-situ TEM nanoindentation for a damaged layer of silicon uses wet etching and ion beam lithography for preparing a silicon wedge sample. In the TEM, a damaged layer of silicon is pressed by using a diamond tip, and the thickness of the damaged layer is 2-200 nm. An in-situ nanoindentation experiment is conducted on the damaged layer of silicon, so as to realize the in-situ TEM nanoindentation experiment on the damaged layer of silicon; and atomic-scale characterization can be conducted.

The technical solution of the present invention is:

A silicon wedge sample is prepared by wet etching and ion beam lithography. The top width of the silicon wedge is 80-100 nm; a tip of an indentation experiment is a cube-corner diamond tip; the curvature radius of the tip is 50-70 nm; the etched silicon wedge is thinned and trimmed by a focused ion beam; thinning uses ion beam of 30 kV: 50-80 nA, and trimming uses ion beam of 5 kV: 1-6 pA; and the top width of the silicon wedge is 80-100 nm. The sample is fixed on a sample holder of an in-situ TEM nanomechanical system by using a conductive silver adhesive. The sample is indented with a tip in the TEM, so that the thickness of the damaged layer of the sample is 2-200 nm; and the in-situ nanoindentation experiment is conducted on the damaged layer of the sample in the TEM. The present invention realizes the in-situ TEM nanoindentation experiment on the damaged layer of silicon, and can conduct atomic-scale characterization.

The sample is a monocrystalline silicon wafer; the diamond tip is a cube-corner tip; and the curvature radius of the tip is 50-70 nm. Monocrystalline silicon has excellent photoelectric performance is and is widely used in semiconductor, microelectronic and optoeletronic industries. A tool of ultraprecision grinding for the monocrystalline silicon is often a diamond wheel. A cube-corner diamond tip with a curvature radius of 50-70 nm is selected. In the indentation experiment process, the sample can be subjected to large stress. Meanwhile, the sample is subjected to complex forces, which is closer to the actual ultraprecision grinding process.

The silicon wafer is cut by a diamond pen into bulks with a length of 3-5 mm and a width of 2-3 mm. To fix the sample to an in-situ TEM nanomechanical test sample rod, the silicon wafer is cut by the diamond pen into the bulks with a length of 3-5 mm and a width of 2-3 mm. A too large sample may touch a TEM pole shoe, and a too small sample may increase the difficulty of sample preparation.

A layer of electron beam photoresist with a thickness of 100-300 nm is shaken on the surface of the silicon wafer, and a rectangular pattern with a width of 400-800 nm and a length of 10-60 μm is made by electron beam lithography. The electron beam lithography is currently a known lithography technology with highest resolution; and moreover, the wavelength of electron rays is small, and the diffraction effect can be ignored. Therefore, the electron beam lithography is selected. Because the rate of the electron beam lithography is slow, the thickness of the electron beam photoresist is selected from 100 nm to 300 nm.

A protective layer of $SiO_2$ with a thickness of 1-3 μm is plated on the surface of the sample. The protective layer is selected from $SiO_2$ because $SiO_2$ film has good anti-etching performance to alkaline solution. In the FH solution, the etching rate of $SiO_2$ is higher than the etching rate of Si. Thus, the $SiO_2$ film is finally easy to remove.

The whole sample is immersed in acetone to conduct ultrasonic cleaning for 10-30 minutes. The acetone can effectively dissolve the photoresist. The whole sample is immersed in the acetone for conducting ultrasonic cleaning for 10-30 minutes to remove the photoresist on the surface of the sample and the protective layer of $SiO_2$ on the photoresist, thereby leaving only the protective layer with the rectangular pattern.

The sample is cleaned with deionized water, and blow-dried with compressed gas. The whole sample is immersed in NaOH solution for etching, and the etching time is 15-30 minutes. The NaOH solution can etch Si and protect the Si below the $SiO_2$ film from being etched.

The sample is cleaned with deionized water, and blow-dried with compressed gas. The whole sample is immersed in HF solution for etching, and the etching time is 5-10 minutes. The etching rate of the HF solution for $SiO_2$ is relatively fast. The whole sample is immersed in the HF solution for conducting etching for 5-10 minutes to remove the $SiO_2$ film.

The sample is cleaned with deionized water, and blow-dried with compressed gas. The etched silicon wedge is thinned and trimmed by a focused ion beam; thinning uses ion beam of 30 kV: 50-80 nA, and trimming uses ion beam of 5 kV: 1-6 pA; and the top width of the silicon wedge is 80-100 nm. To observe the sample at the atomic scale, the thickness of the sample shall be less than 100 nm. Therefore, the etched silicon wedge sample needs to be thinned. Because the curvature radius of the tip is 50-70 nm, the top width of the silicon wedge is finally 80-100 nm. Because a large ion beam may damage the sample, thinning selects ion beam of 30 kV: 50-120 pA, and trimming uses ion beam of 5 kV: 10-30 pA, to remove the damaged layer.

The sample is fixed on a sample holder of an in-situ TEM nanomechanical system by using a conductive silver adhesive. In the TEM, the better the conductivity is, the clearer and more stable the imaging is. Thus, the sample is fixed on the sample holder by using the conductive silver adhesive.

The sample holder is fixed on the sample rod by screws; the sample is indented by using the diamond tip in the TEM; and the thickness of the damaged layer of the sample is 2-200 nm. The sample is indented in the TEM, and the thickness of the damaged layer can be accurately controlled, so that the damaged layers of different thicknesses can be subjected to an in-situ nanoindentation experiment.

The damaged layers of the sample are subjected to the in-situ nanoindentation experiment in the TEM, thereby realizing real-time observation for the origin and evolution of stress-induced damage of the damaged layers. The in-situ TEM nanomechanical test can realize loading and deformation at the atomic scale and nano scale, and is an effective method to research the nano-sized material removal mechanism and damage origin and evolution of the damaged layers caused by abrasive particle processing.

The effects and benefits of the present invention are: wet etching and ion beam lithography are used for preparing the silicon wedge sample, so as to realize the in-situ TEM nanoindentation experiment on the damaged layer of silicon; and atomic-scale characterization can be conducted.

DESCRIPTION OF DRAWINGS

FIG. 1 shows views of a TEM image, a is a low magnification TEM morphology image of a silicon wedge sample without damaged layer, and b is a high resolution TEM image of a block part of a.

FIG. 2 shows views of a TEM image, a is a low magnification TEM morphology image of a silicon wedge sample with damaged layer of thickness of 67 nm, and b is a high resolution TEM image of a block part of a.

FIG. 3 shows views of a TEM image, a is a low magnification TEM morphology image after a damaged layer of a silicon wedge sample is subjected to in-situ TEM nanoindentation, and b is a high resolution TEM image of a block part of a.

DETAILED DESCRIPTION

Specific embodiments of the present invention are further described below in combination with accompanying drawings and the technical solution.

Embodiments

Figure 1:
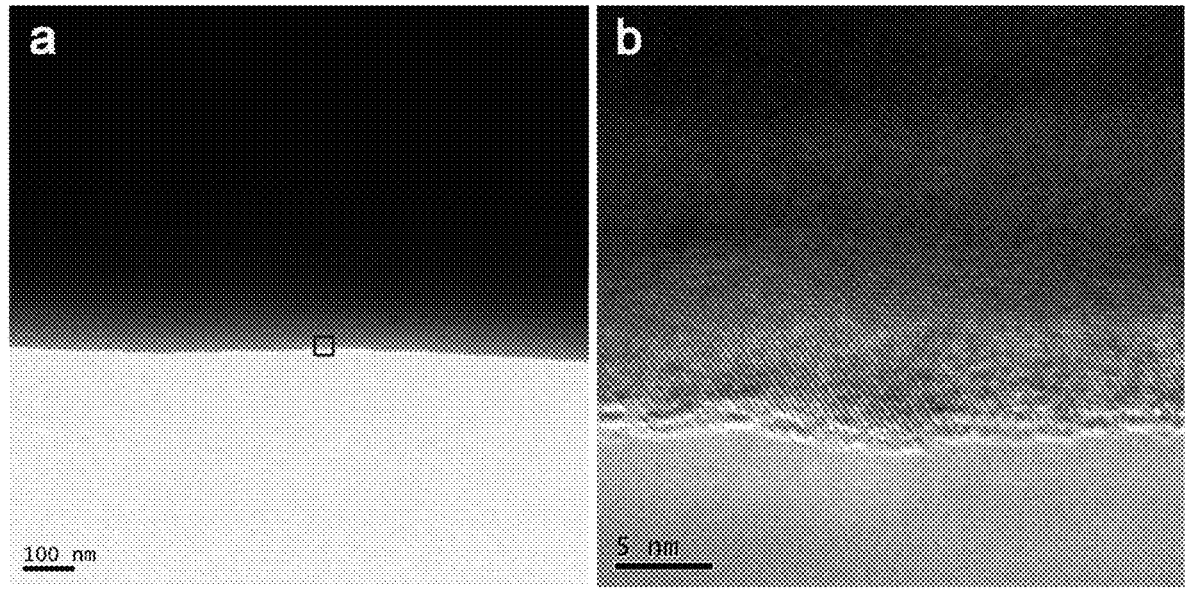
Figure 2:
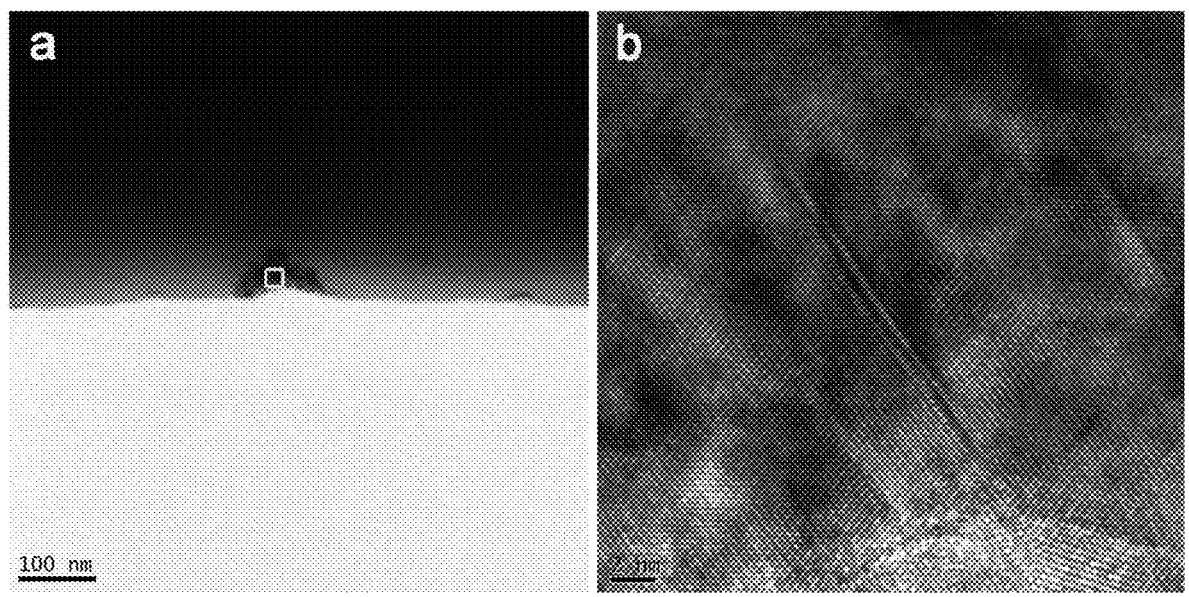
Figure 3:
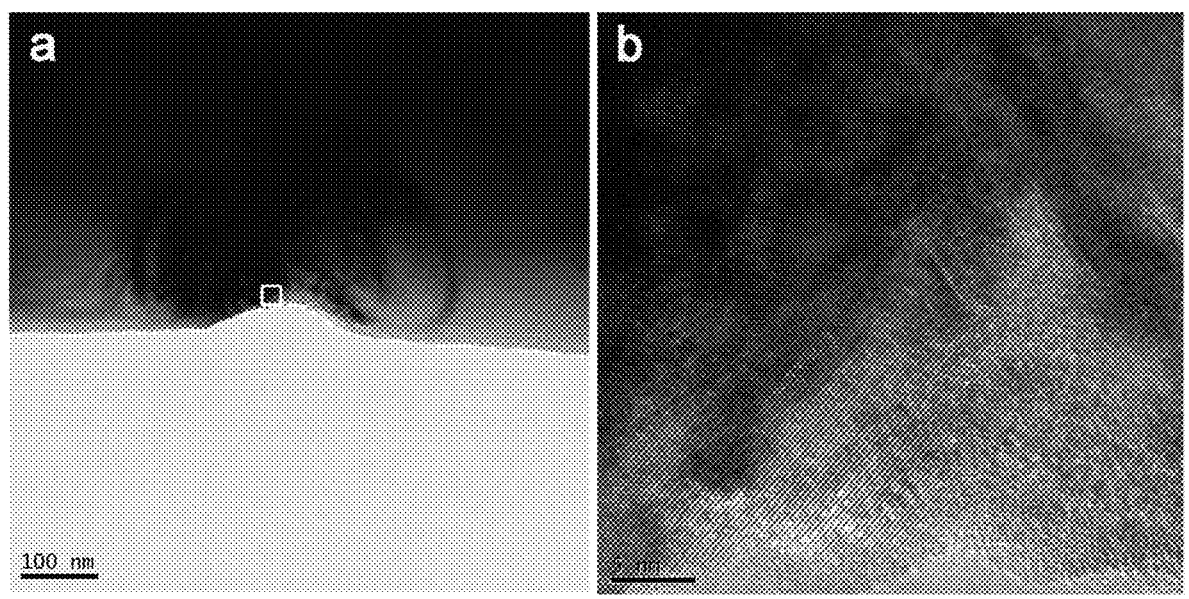

The silicon wafer is cut by the diamond pen into bulks with a length of 4 mm and a width of 3 mm. A layer of electron beam photoresist with a thickness of 200 nm is shaken on the surface of the silicon wafer, and a rectangular pattern with a width of 600 nm and a length of 30 μm is made by electron beam lithography. A protective layer of $SiO_2$ with a thickness of 1.5 μm is plated on the surface of the sample. The whole sample is immersed in the acetone for conducting ultrasonic cleaning for 20 minutes to remove the electron beam photoresist and the protective layer of $SiO_2$ on the photoresist, thereby leaving only the protective layer of $SiO_2$ with the rectangular pattern. The sample is cleaned with deionized water, and blow-dried with compressed gas. The whole sample is immersed in NaOH solution for etching, and the etching time is 25 minutes. The sample is cleaned with deionized water, and blow-dried with compressed gas. The whole sample is immersed in HF solution for etching, and the etching time is 8 minutes, to remove the protective layer of $SiO_2$. The sample is cleaned with deionized water, and blow-dried with compressed gas. The etched silicon wedge is thinned and trimmed by a focused ion beam; thinning uses ion beam of 30 kV: 50 pA, and trimming uses ion beam of 5 kV: 20 pA; and the top width of the silicon wedge is 80 nm. The sample is fixed on a sample holder of an in-situ TEM nanomechanical system by using a conductive silver adhesive. The sample holder is fixed on the sample rod by screws. The TEM image of the prepared silicon wedge sample is shown in FIG. 1a. FIG. 1b is a high resolution TEM image of a block part of FIG. 1a. It can be seen that the sample is crystalline silicon without lattice defect. The sample is indented by using a cube-corner diamond tip with a curvature radius of 66 nm in the TEM; and the thickness of the damaged layer of the sample is 67 nm, as shown in FIG. 2a. FIG. 2b is a high resolution TEM image of a block part of FIG. 2a. The damaged layers of the sample are subjected to the in-situ indentation experiment in the TEM. FIG. 3a is a low magnification TEM morphology image after a damaged layer of a silicon wedge sample is subjected to in-situ TEM nanoindentation, and FIG. 3b is a high resolution TEM image of a block part of FIG. 3a.

The invention claimed is:
1. A method of in-situ TEM nanoindentation for a damaged layer of silicon, using wet etching and ion beam lithography for preparing a silicon wedge sample, pressing a damaged layer of silicon by using a diamond tip in the TEM, and conducting an in-situ nanoindentation experiment on the damaged layer of silicon, wherein

(1) the sample is a monocrystalline silicon wafer; the diamond tip is a cube-corner tip; and the curvature radius of the tip is 50-70 nm;

(2) the silicon wafer is cut by a diamond pen into bulks with a length of 3-5 mm and a width of 2-3 mm;

(3) a layer of electron beam photoresist with a thickness of 100-300 nm is shaken on the surface of the monocrystalline silicon wafer, and a rectangular pattern with a width of 400-800 nm and a length of 10-60 μm is made by electron beam lithography;

(4) a protective layer of $SiO_2$ with a thickness of 1-3 μm is plated on the surface of the sample;

(5) the whole sample is immersed in acetone to conduct ultrasonic cleaning for 10-30 minutes;

(6) the sample is cleaned with deionized water, and blow-dried with compressed gas; the whole sample is immersed in NaOH solution for etching, and the etching time is 15-30 minutes, to form a silicon wedge;

(7) the silicon wedge is cleaned with deionized water, and blow-dried with compressed gas; the whole sample is immersed in HF solution for etching, and the etching time is 5-10 minutes;

(8) the sample is cleaned with deionized water, and blow-dried with compressed gas; the etched silicon wedge is thinned and trimmed by a focused ion beam; thinning uses ion beam of 30 kV: 50-80 nA, and trimming uses ion beam of 5 kV: 1-6 pA; and the top width of the silicon wedge is 80-100 nm;

(9) the sample is fixed on a sample holder of an in-situ TEM nanomechanical system by using a conductive silver adhesive;

(10) the sample holder is fixed on a sample rod by screws; the sample is indented by using the diamond tip in the TEM; and the thickness of the damaged layer of the sample is 2-200 nm;

(11) the damaged layer of the sample is subjected to the in-situ nanoindentation experiment in the TEM, thereby realizing real-time observation for the origin and evolution of stress-induced damage of the damaged layer.

* * * * *